United States Patent
Maeda et al.

(10) Patent No.: US 7,289,298 B2
(45) Date of Patent: Oct. 30, 2007

(54) PERPENDICULAR MAGNETIC RECORDING MEDIUM, METHOD FOR MANUFACTURING THE SAME, AND MAGNETIC RECORDING/REPRODUCING APPARATUS

(75) Inventors: Tomoyuki Maeda, Funabashi (JP); Takashi Hikosaka, Tokyo (JP); Futoshi Nakamura, Ichikawa (JP); Takeshi Iwasaki, Funabashi (JP); Hiroshi Sakai, Ichihara (JP); Kenji Shimizu, Ichihara (JP); Akira Sakawaki, Ichihara (JP)

(73) Assignees: Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 121 days.

(21) Appl. No.: 10/793,950

(22) Filed: Mar. 8, 2004

(65) Prior Publication Data
US 2004/0229083 A1   Nov. 18, 2004

(30) Foreign Application Priority Data
Mar. 31, 2003   (JP)   ............... 2003-097317

(51) Int. Cl.
  *G11B 5/66*   (2006.01)
(52) U.S. Cl. ............. 360/131; 428/832; 428/836.1
(58) Field of Classification Search ......... 428/836.3
  See application file for complete search history.

(56) References Cited

U.S. PATENT DOCUMENTS 5,851,688 A * 12/1998 Chen et al. ............... 428/32.1
6,183,893 B1   2/2001 Futamoto et al.
RE38,544 E * 7/2004 Chen et al. ............... 204/192.2
2002/0048693 A1   4/2002 Tanahashi et al.
2002/0086187 A1   7/2002 Lee
2003/0162055 A1* 8/2003 Lu et al. ............... 428/694 MT

FOREIGN PATENT DOCUMENTS

| JP | 05-094614 | 4/1993 |
|----|-----------|--------|
| JP | 2000-251236 | 9/2000 |
| JP | 2001-15337 | 1/2001 |
| JP | 2001-76329 | 3/2001 |

OTHER PUBLICATIONS

U.S. Appl. No. 10/722,599, Maeda.
Austrian Search Report dated Jan. 27, 2005 for Appln. No. 200401340-5.
Chinese Office Action dated Dec. 9, 2005 for Appln. No. 2004100451248.

* cited by examiner

*Primary Examiner*—Kevin M. Bernatz
(74) *Attorney, Agent, or Firm*—Pillsbury Winthrop Shaw Pittman, LLP

(57) ABSTRACT

Disclosed is a magnetic recording medium which includes a substrate, an underlayer, and a perpendicular magnetic recording layer, and in which this perpendicular magnetic recording layer contains magnetic crystal grains and a matrix surrounding the magnetic crystal grains, and the matrix contains an element selected from Zn, Cd, Al, Ga, and In, and a component selected from P, As, Sb, S, Se, and Te.

10 Claims, 9 Drawing Sheets

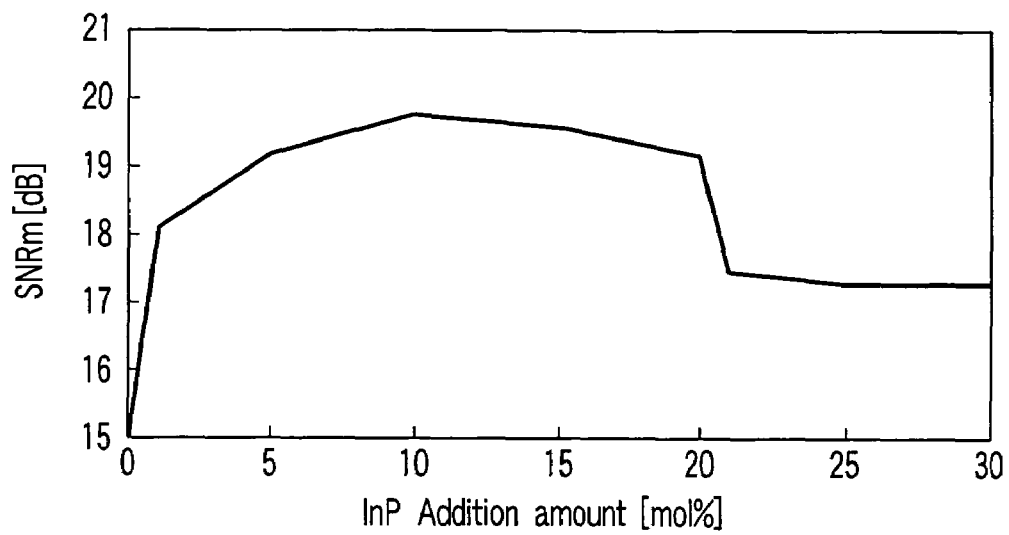
F I G. 9
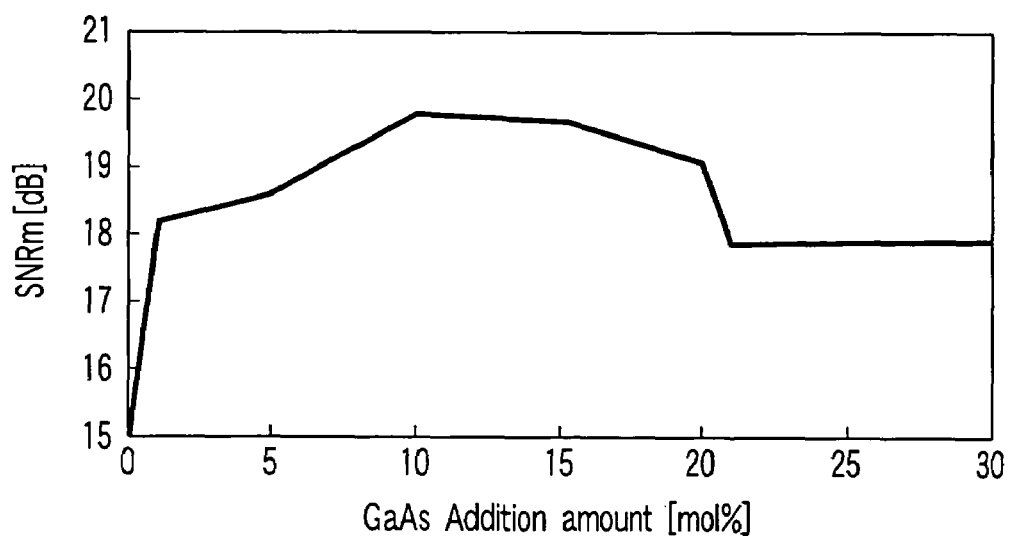
F I G. 10

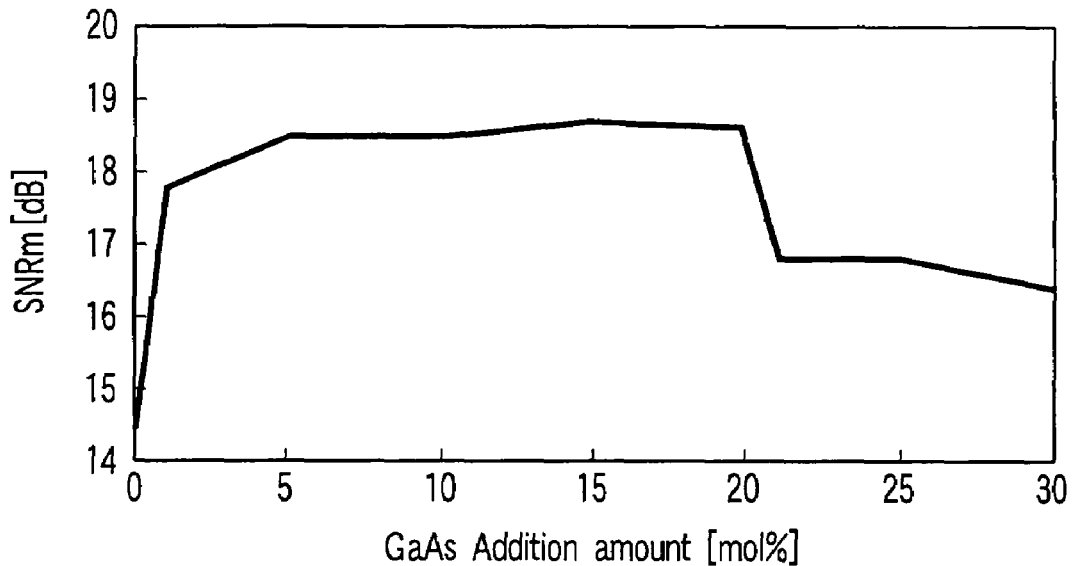
F I G. 13
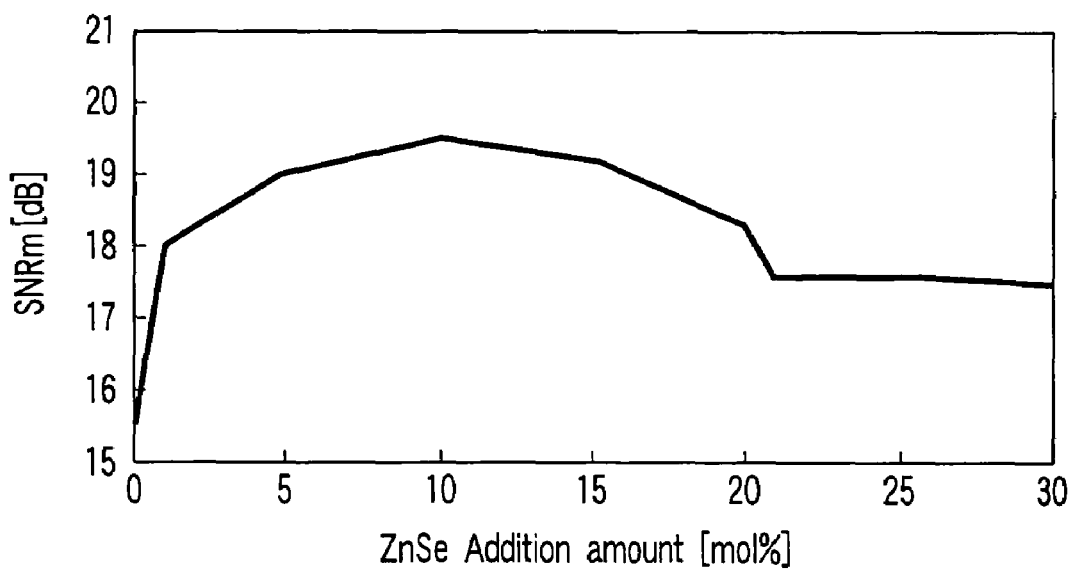
F I G. 14

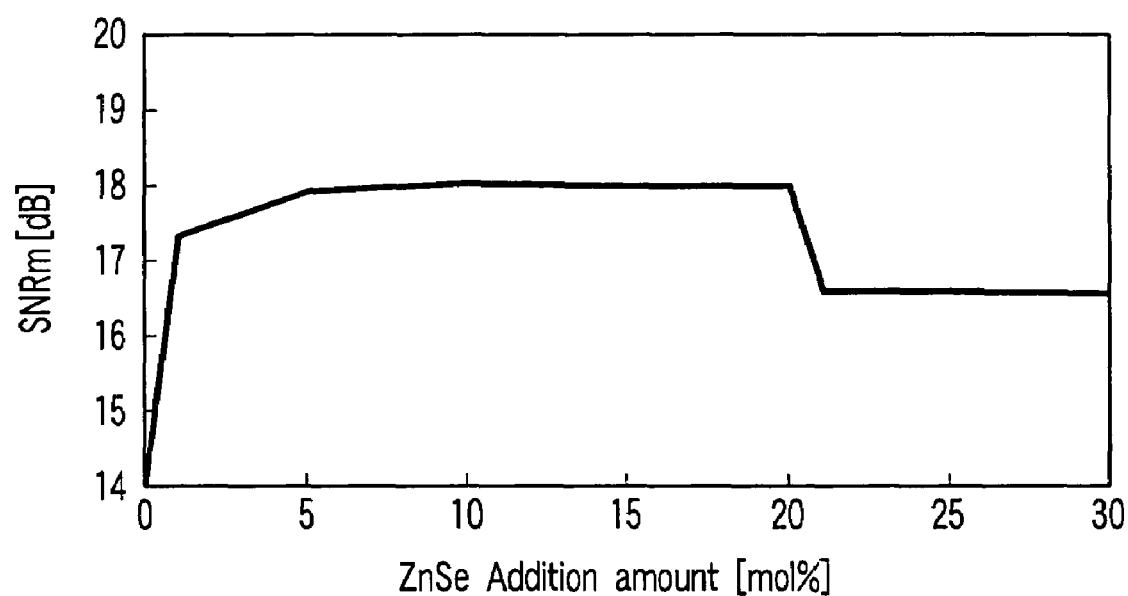
F I G. 17

PERPENDICULAR MAGNETIC RECORDING MEDIUM, METHOD FOR MANUFACTURING THE SAME, AND MAGNETIC RECORDING/REPRODUCING APPARATUS

CROSS-REFERENCE TO RELATED APPLICATIONS

This application is based upon and claims the benefit of priority from prior Japanese Patent Application No. 2003-097317, filed Mar. 31, 2003, the entire contents of which are incorporated herein by reference.

BACKGROUND OF THE INVENTION

1. Field of the Invention

The present invention relates to a magnetic recording medium for use in a hard disk drive using the magnetic recording technique, a method of manufacturing the magnetic recording medium, and a magnetic recording/reproducing apparatus.

2. Description of the Related Art

A magnetic storage device (HDD) mainly used in computers to record and reproduce information is recently gradually extending its applications because of its large capacity, inexpensiveness, high data access speed, data holding reliability, and the like. The HDD is now used in various fields such as household video decks, audio apparatuses, and car navigation systems. As the range of use of the HDD widens, demands for increasing the storage capacity or density of the HDD are also increasing. In recent years, high-density HDDs are being more and more extensively developed.

The longitudinal magnetic recording system is used in magnetic recording/reproducing apparatuses presently put on the market. In a magnetic recording layer used, magnetic grains for recording information have an easy axis of magnetization parallel to the substrate. The easy axis of magnetization is an axis in the direction of which magnetization easily points. In the case of a Co-based alloy, the c axis of the hcp structure of Co is the easy axis of magnetization. In a longitudinal magnetic recording medium, recording bits of a magnetic recording layer may become too small as the recording density increases. If this is the case, a so-called thermal decay effect by which information in these recording bits is thermally erased may worsen the recording/reproduction characteristics. Additionally, as the recording density increases, noise generated from the medium tends to increase due to the influence of an antimagnetic field generated in the boundary between the recording bits.

In contrast, in a so-called perpendicular magnetic recording system in which the easy axis of magnetization in the magnetic recording layer is oriented substantially perpendicularly to the substrate, the influence of an antimagnetic field between recording bits is small even when the recording density increases, and the operation is magnetostatically stable even at high density. Therefore, this perpendicular magnetic recording system is recently very noted as a technique which replaces the longitudinal recording system. The perpendicular magnetic recording medium is generally formed by a substrate, an orientation control underlayer for orienting a magnetic recording layer, a magnetic recording layer made of a hard magnetic material, and a protective layer for protecting the surface of the magnetic recording layer. In addition, a soft magnetic backing layer for concentrating a magnetic flux generated from a magnetic head during recording is formed between the substrate and underlayer.

Even in the perpendicular magnetic recording medium, to increase the recording density, it is necessary to reduce noise while the thermal stability is maintained. Various methods can be used to decrease the size of magnetic crystal grains for recording information, in order to increase the recording density. Generally, a method of decreasing the size of magnetic crystal grains in the recording layer is used. In the case of a CoCr-based magnetic layer presently extensively used, the grain size of magnetic grains is decreased by adding Ta or B to the layer or heating the layer at an appropriate temperature, thereby segregating nonmagnetic Cr in the grain boundary. However, downsizing of magnetic grains by Cr segregation has its limits. Also, the degree of this Cr segregation in the perpendicular magnetic recording medium is smaller than that in the longitudinal magnetic recording medium. Therefore, separation between the magnetic grains is insufficient, so the magnetic interaction between the grains remains relatively large. This poses the problem that transition noise between recording bits cannot be well reduced.

As a method of reducing this magnetic interaction, Jpn. Pat. Appln. KOKAI Publication No. 2001-76329 discloses a method of adding an oxide or nitride such as $SiO_2$, $ZrO_2$, or TiN to a recording layer, thereby forming a magnetic recording layer having a granular structure in which magnetic crystal grains are surrounded by this additive.

Unfortunately, the diffusion rate of an oxide or nitride is generally low, so precipitation to the magnetic crystal grain boundary is insufficient. Accordingly, a portion of the oxide or nitride which has not completely precipitated forms a supersaturated solid solution with the magnetic crystal grains, thereby disturbing the crystallinity and orientation of the magnetic crystal grains. Consequently, the signal-to-noise ratio (SNR) of the recording/reproduction (R/W) characteristics lowers.

BRIEF SUMMARY OF THE INVENTION

First, the present invention provides a perpendicular magnetic recording medium comprising a substrate, an underlayer formed on the substrate, and a perpendicular magnetic recording layer formed on the underlayer, having an easy axis of magnetization oriented perpendicularly to the substrate, and having magnetic crystal grains and a matrix surrounding the magnetic crystal grains, wherein the matrix contains at least one element selected from the group consisting of Zn, Cd, Al, Ga, and In, and at least one element selected from the group consisting of P, As, Sb, S, Se, and Te.

Second, the present invention provides a method of manufacturing a perpendicular magnetic recording medium comprising:

preparing a substrate having an underlayer formed thereon, and depositing, on the underlayer, a magnetic crystal grain material and a matrix material containing at least one element selected from the group consisting of Zn, Cd, Al, Ga, and In, and at least one element selected from the group consisting of P, As, Sb, S, Se, and Te, thereby forming a perpendicular magnetic recording layer having magnetic crystal grains and a matrix surrounding the magnetic crystal grains.

Third, the present invention provides a magnetic recording/reproducing apparatus comprising the perpendicular magnetic recording medium described above, and a recording/reproducing head.

BRIEF DESCRIPTION OF THE SEVERAL VIEWS OF THE DRAWING

The accompanying drawings, which are incorporated in and constitute a part of the specification, illustrate presently embodiments of the invention and, together with the general description given above and the detailed description of the embodiments given below, serve to explain the principles of the invention.

FIG. 9 is a graph showing the relationship between the InP addition amount and the SNRm value in Embodiment 4;

FIG. 10 is a graph showing the relationship between the GaAs addition amount and the SNRm value in Embodiment 5;

FIG. 13 is a graph showing the relationship between the GaAs addition amount and the SNRm value in Embodiment 8;

FIG. 14 is a graph showing the relationship between the ZnSe addition amount and the SNRm value in Embodiment 9;

FIG. 17 is a graph showing the relationship between the ZnSe addition amount and the SNRm value in Embodiment 12.

DETAILED DESCRIPTION OF THE INVENTION

Figure 1:
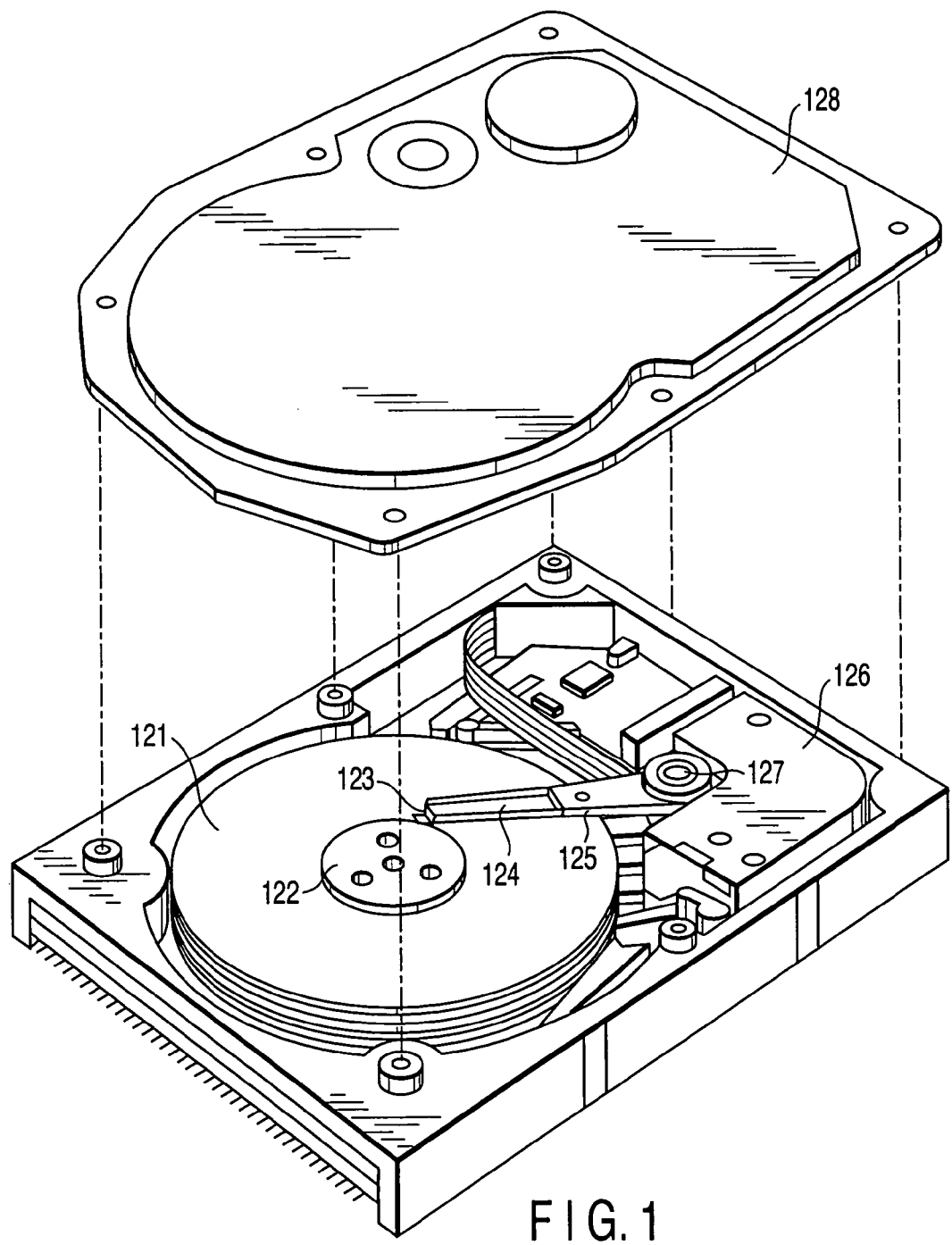
FIG. 1 is a perspective view showing an example of a magnetic recording/reproducing apparatus of the present invention.

A perpendicular magnetic recording medium of the present invention has a multilayered structure in which an underlayer and a perpendicular magnetic recording layer having an easy axis of magnetization oriented perpendicularly to a substrate are stacked in this order on the substrate. The perpendicular magnetic recording layer contains magnetic crystal grains, and a matrix surrounding the magnetic crystal grains. This matrix contains at least one first component element selected from the group consisting of Zn, Cd, Al, Ga, and In, and at least one second component element selected from the group consisting of P, As, Sb, S, Se, and Te.

A magnetic recording/reproducing apparatus of the present invention comprises the perpendicular magnetic recording medium described above, and a recording/reproducing head.

A perpendicular magnetic recording medium manufacturing method of the present invention comprises depositing a magnetic crystal grain material and a matrix material containing at least one first component element selected from the group consisting of Zn, Cd, Al, Ga, and In, and at least one second component element selected from the group consisting of P, As, Sb, S, Se, and Te, thereby forming a perpendicular magnetic recording layer having magnetic crystal grains and a matrix surrounding the magnetic crystal grains on a substrate on which an underlayer is formed.

Deposition herein mentioned includes chemical vapor deposition such as vacuum evaporation and physical vapor deposition such as sputtering.

The first and second component elements used in the present invention are low-melting elements. However, a compound containing these first and second component elements has a melting point higher than those of the individual elements.

In the present invention, as an additive for separating and downsizing magnetic crystal grains, a matrix material made of low-melting elements and having a melting point as a compound higher than those of the individual low-melting elements. When deposition is performed by using this matrix material, compound molecules which have flied and condensed on a substrate and deposited grains which fly subsequently to the compound molecules collide against each other. The impact of this collision causes a phenomenon in which the previously condensed compound molecules dissociate into a component element atomic state. Along with this dissociation from the compound state to the atomic state, the inter-atom bonding energy for forming the compound is released to locally heat each dissociated element to a high temperature. Since each element has a low melting point, the diffusion rate is originally high. In addition to that, the thermal energy is given to each element as described above. Consequently, these elements diffuse at a very high speed to soon reach a stable location, and recombine into the compound state.

Accordingly, when this matrix material is deposited simultaneously with the magnetic crystal grain material, the matrix material diffuses at a high speed to well precipitate in the grain boundary of magnetic crystal grains. In the present invention, therefore, a fine granular structure can be formed by using a combination of predetermined component elements as an additive for separating and downsizing magnetic crystal grains, without forming any supersaturated solid solution with the magnetic crystal grains.

On the other hand, when a conventional oxide such as $SiO_2$ or a nitride is used, one element changes into gas molecules at room temperature, so this element evaporates again after dissociation. Accordingly, no such phenomena as high-speed diffusion and recombination appear.

Examples of compounds usable as the matrix material are AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe. Since any of these compounds has a high melting point of 1,000° C. or more, the compound has high bonding energy and releases high energy when it dissociates. This can make the diffusion rate higher. Moreover in one embodiment, compounds can be selected from InP, GaAs, ZnSe, ZnS, and ZnTe. These compounds have the advantage that the formation of targets for sputtering film formation is relatively easy.

In one embodiment he addition amount in the perpendicular magnetic recording medium can be a total of 20 mol % or less, and moreover in some embodiment, it can be 0.1 to 20 mol %. If this addition amount is less than 0.1 mol %, no remarkable effect of increasing the value of SNR of the R/W characteristics tends to be appears. If the addition amount exceeds 20 mol %, the reproduction output of the R/W characteristics tends to lower.

As the magnetic crystal grain material, in one embodiment, it is possible to use, e.g., a Co—Pt-based, Fe—Pt-based, or Fe—Pd-based alloy. Any of these alloys has high crystal magnetic anisotropic energy. An additive element such as Cr or Cu can be added, if necessary, to these alloy systems, in order to improve the magnetic characteristics.

Moreover in one embodiment, examples are CoCrPt, FePtCu, FeCoPd, FePd, FeCoPt, FePdCu, FePtPd, CoCrPtB, CoCrPtTa, CoCrPtNd, and CoCrPtCu.

Examples of the underlayer of the perpendicular magnetic recording layer are Ru, Pt, Pd, Cr, NiAl, MgO, Ti, CoCr, Ir, Ag, and Fe.

The underlayer can be a two or more stacked layer where necessary. Examples of the stacked layers are Ta/Ru, Ta/Ti/Ru, NiAl/Pt, NiAl/Cr/Pt, Ta/Ti/CoCr, NiTa/Ru, NiTa/Ti/Ru, NiTa/Ti/CoCr, NiNb/Ru, NiNb/Ti/Ru, NiNb/Ti/CoCr, NiAl/Pd, NiAl/Ir, NiAl/Ag, NiAl/Cr/Pd, NiAl/Cr/Ir, NiAl/Cr/Ag, NiAl/Fe/Pt, NiAl/Fe/Pd, NiAl/Fe/Ir, NiAl/Fe/Ag, MgO/Pt, MgO/Pd, MgO/Ag, MgO/Ir, MgO/Cr/Pt, MgO/Cr/Pd, MgO/Cr/Ag, MgO/Cr/Ir, MgO/Fe/Pt, MgO/Fe/Pd, MgO/Fe/Ir, and MgO/Fe/Ag, each stacked in the order named from the substrate.

A soft magnetic layer can be formed between the underlayer and substrate.

When a soft magnetic layer having high magnetic permeability is formed, a so-called double-layered perpendicular medium having a perpendicular magnetic recording layer on this soft magnetic layer is obtained. In this double-layered perpendicular medium, the soft magnetic layer performs part of the function of a magnetic head, e.g., a single pole head, for magnetizing the perpendicular magnetic recording layer; the soft magnetic layer horizontally passes the recording magnetic field from a magnetic head and returns the recording magnetic field to the magnetic head. That is, the soft magnetic field can apply a steep sufficient perpendicular magnetic field to the magnetic recording layer, thereby increasing the recording/reproduction efficiency.

Examples of the soft magnetic layer are CoZrNb, FeSiAl, FeTaC, CoTaC, NiFe, Fe, FeCoB, FeCoN, and FeTaN.

In addition, a bias application layer such as a longitudinal hard magnetic film or antiferromagnetic film can be formed between the soft magnetic layer and substrate. The soft magnetic layer readily forms a magnetic domain, and this magnetic domain generates spike noise. The generation of a magnetic wall can be prevented by applying a magnetic field in one direction of the radial direction of the bias application layer, thereby applying a bias magnetic field to the soft magnetic layer formed on the bias application layer. It is also possible to give the bias application layer a stacked structure to finely disperse the anisotropy and make a large magnetic domain difficult to form. Examples of the bias application layer material are CoCrPt, CoCrPtB, CoCrPtTa, CoCrPtTaNd, CoSm, CoPt, CoPtO, CoPtCrO, CoPt—$SiO_2$, CoCrPt—$SiO_2$, and CoCrPtO—$SiO_2$.

As the nonmagnetic substrate, it is possible to use, e.g., a glass substrate, an Al-based alloy substrate, an Si single-crystal substrate having an oxidized surface, ceramics, and plastic. Similar effects can be expected even when the surface of any of these nonmagnetic substrates is plated with an NiP alloy or the like.

A protective layer can be formed on the magnetic recording layer. Examples of this protective layer are C, diamond like carbon (DLC), $SiN_x$, $SiO_x$, and $CN_x$.

As sputtering, it is possible to use single-element sputtering using a composite target, or multi-element simultaneous sputtering using targets of individual materials.

FIG. 1 is a partially exploded perspective view showing an example of the magnetic recording/reproducing apparatus of the present invention.

A rigid magnetic disk 121 for recording information according to the present invention is fitted on a spindle 122 and rotated at a predetermined rotational speed by a spindle motor (not shown). A slider 123 mounting a single pole recording head for accessing the magnetic disk 121 to record information and an MR head for reproducing information is attached to the end portion of a suspension 124 which is a thin leaf spring. The suspension 124 is connected to one end of an arm 125 having, e.g., a bobbin which holds a driving coil (not shown).

A voice coil motor 126 as a kind of a linear motor is attached to the other end of the arm 125. The voice coil motor 126 includes the driving coil (not shown) wound around the bobbin of the arm 125, and a magnetic circuit having a permanent magnetic and counter yoke opposing each other on the two sides of the driving coil.

The arm 125 is held by ball bearings (not shown) formed in two, upper and lower portions of a fixed shaft 127, and pivoted by the voice coil motor 126. That is, the position of the slider 123 on the magnetic disk 121 is controlled by the voice coil motor 126. Reference numeral 128 in FIG. 1 denotes a lid.

EMBODIMENTS

The present invention will be described in more detail below by way of its embodiments.

Embodiment 1

A 2.5-inch, hard-disk-like nonmagnetic glass substrate was prepared.

After a vacuum chamber of a sputtering apparatus was evacuated to $2 \times 10^{-5}$ Pa or less, a 200-nm thick $Co_{84}Zr_6Nb_{10}$ soft magnetic layer and 8-nm thick Ta layer were formed as a soft magnetic layer and first underlayer, respectively, in a 0.67-Pa Ar ambient by using a $Co_{84}Zr_6Nb_{10}$ target and Ta target, respectively. After that, a 15-nm thick Ru layer was stacked as a second underlayer in a 3-Pa Ar ambient.

Subsequently, a 20-nm thick magnetic recording layer was formed by using a composite target obtained by adding 0 to 30 mol % of InP as a matrix material to Co-10 at % Cr-14 at % Pt as a magnetic crystal grain material. A 7-nm thick C layer was then stacked as a protective layer in a 0.67-Pa Ar ambient. After the film formation, the surface of the protective layer was coated with a 13-Å thick perfluoropolyether (PFPE) lubricating agent by dipping, thereby obtaining a magnetic recording medium. The electric power applied to each target was 1,000 W.

In addition, various magnetic recording media were obtained following the same procedures as above except that AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were used as matrix materials, and $SiO_2$ was used for comparison.

Figure 2:
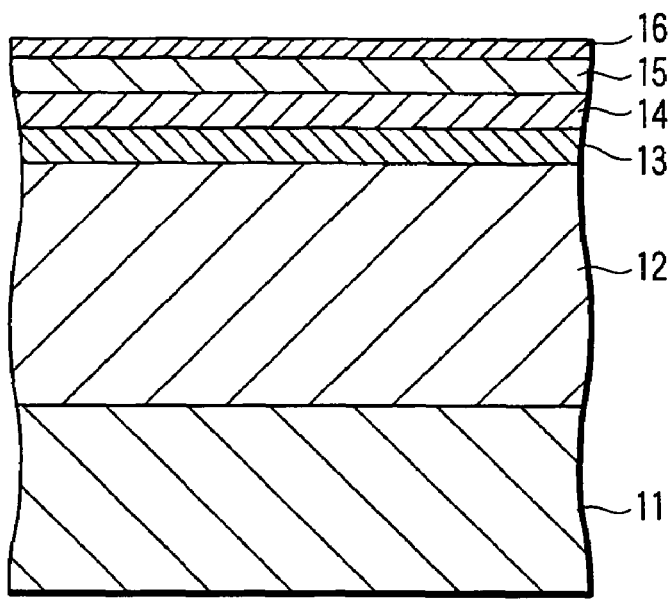
FIG. 2 is a sectional view showing the arrangement of the first example of a perpendicular magnetic recording medium of the present invention.

FIG. 2 is a sectional view showing an example of the obtained perpendicular magnetic recording media.

As shown in FIG. 2, this perpendicular magnetic recording medium has an arrangement in which a soft magnetic layer 12, first underlayer 13, second underlayer 14, perpendicular magnetic recording layer 15, and protective layer 16 are stacked in this order on a substrate 11.

The R/W characteristics of each perpendicular magnetic recording medium were evaluated by using a spin stand. As a magnetic head, a combination of a single pole head having a recording track width of 0.3 μm and an MR head having a reproducing track width of 0.2 μm was used.

The measurement was performed in a fixed radial position of 20 mm by rotating the disk at 4,200 rpm.

The value of the signal-to-noise ratio (SNRm) of a waveform differentiated by a differentiating circuit was evaluated as a medium SNR, and a half-width dPW50 of the differentiated waveform was evaluated as an index of the recording resolution. Note that S is a value obtained by halving a pp value, i.e., a difference between maximum + and − values resulting from one magnetization reversal of a solitary waveform at 119 kfci, and Nm is the value of rms (root mean square) at 716 kfci.

Table 1 below shows the SNRm values and dPW50 values when the addition amount of each compound as the matrix material was 10 mol %.

Figure 3:
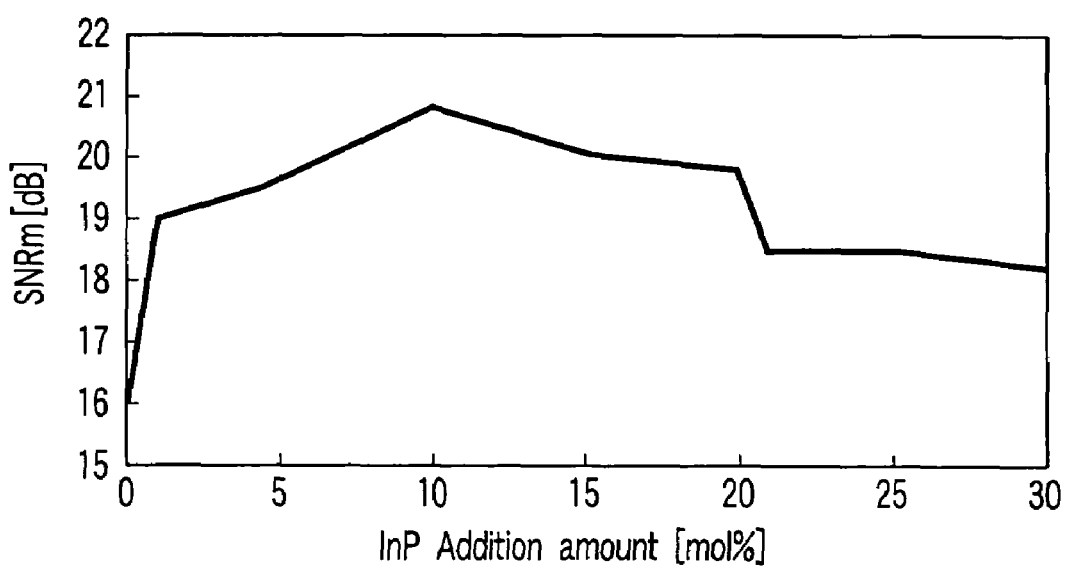
FIG. 3 is a graph showing the relationship between the InP addition amount and the SNRm value in Embodiment 1.

FIG. 3 is a graph showing the relationship between the addition amount and SNRm value when the compound as the matrix material was InP. Moreover in one embodiment, it was found that the SNRm value increased when the addition amount was 1 to 20 mol %. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were added.

Fine structures of the recording layers of the media in which the addition amounts were 1 and 10 mol % were observed by using a transmission electron microscope (TEM) having an acceleration voltage of 400 kV. Consequently, when the addition amount was 10 mol %, a magnetic crystal grain portion and crystal grain boundary portion were clearly observed, indicating that a granular structure in which the matrix surrounded the magnetic crystal grains was formed. On the other hand, when the addition amount was 1 mol %, no crystal grain boundary portion was clearly observed.

Table 1 below shows the average crystal grain sizes estimated from planar TEM images when the addition amount was 10 mol %.

TABLE 1

| Compound | SNRm (dB) | dPW50 (nm) | Average grain size (nm) |
|---|---|---|---|
| $SiO_2$ | 18.2 | 102 | 11.6 |
| AlAs | 20.7 | 78 | 6.1 |
| AlP | 19.9 | 76 | 6.0 |
| AlSb | 19.7 | 81 | 6.3 |
| $Al_2S_3$ | 20.0 | 85 | 5.9 |

TABLE 1-continued

| Compound | SNRm (dB) | dPW50 (nm) | Average grain size (nm) |
|---|---|---|---|
| $Al_2Se_3$ | 19.8 | 76 | 6.9 |
| $Al_2Te_3$ | 19.7 | 74 | 5.8 |
| CdS | 19.4 | 75 | 6.1 |
| CdSe | 19.4 | 82 | 6.3 |
| CdTe | 19.2 | 80 | 6.4 |
| GaAs | 20.3 | 70 | 6.8 |
| GaP | 20.4 | 81 | 6.3 |
| $Ga_2S_3$ | 19.6 | 79 | 6.7 |
| InP | 20.8 | 76 | 6.2 |
| $In_2S_3$ | 19.9 | 75 | 6.3 |
| ZnS | 20.6 | 77 | 6.5 |
| ZnTe | 20.2 | 80 | 5.9 |
| ZnSe | 20.8 | 76 | 5.9 |

As shown in Table 1, when compared to the medium to which $SiO_2$ was added, the SNRm value and dPW50 value were better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

Also, when compared to the medium to which $SiO_2$ was added, the average crystal grain size reduced when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

In addition, the combined state of In and P of each medium in which the addition amount of the compound as the matrix material was 10 mol % was evaluated by using X-ray photoelectron spectroscopy (XPS). As a consequence, most portions of In and P combined to form an InP compound. Similarly, most portions of elements formed compounds even when AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were used.

By using InP as the matrix material compound, magnetic recording media having various underlayer combinations shown in Table 2 below were formed and evaluated following the same procedures as above except that the first underlayer was replaced with Ta, Ni-40 at % Ta, or Ni-30 at % Nb, and the second underlayer was replaced with Ru, Co-30 at % Cr, or Ti.

Table 2 below shows the SNRm values when the InP addition amount was 10 mol %.

TABLE 2

| First underlayer | Second underlayer | SNRm (dB) |
|---|---|---|
| Ta | Ru | 20.8 |
| Ta | Co70—Cr30 | 20.5 |
| Ta | Ti | 20.0 |
| Ni60—Ta40 | Ru | 20.9 |
| Ni60—Ta40 | Co70—Cr30 | 20.7 |
| Ni60—Ta40 | Ti | 20.5 |
| Ni70—Nb30 | Ru | 20.8 |
| Ni70—Nb30 | Co70—Cr30 | 20.8 |
| Ni70—Nb30 | Ti | 20.7 |

As shown in Table 2, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were added.

Embodiment 2

A 2.5-inch, hard-disk-like nonmagnetic glass substrate was prepared.

After a vacuum chamber of a sputtering apparatus was evacuated to $2\times10^{-5}$ Pa or less, a 5-nm thick Ta layer was formed as a first underlayer in a 0.67-Pa Ar ambient. After that, a 15-nm thick Ru layer was stacked as a second underlayer in an 8-Pa Ar ambient.

Subsequently, a 15-nm thick magnetic recording layer was formed in an 8-Pa Ar ambient by two-target simultaneous sputtering by using a Co-10 at % Cr-14 at % Pt target as a magnetic crystal grain material and an InP target as a matrix material. During this sputtering, the electric power to be applied to each target was so controlled as to appropriately change the addition amount of the matrix material between 0 and 30 mol % with respect to the magnetic crystal grain material. A 7-nm thick C layer was then stacked as a protective layer in a 0.67-Pa Ar ambient. After the film formation, the surface of the protective layer was coated with a 13-Å thick PFPE lubricating agent by dipping, thereby obtaining a magnetic recording medium. The electric power applied to each target was 1,000 W.

In addition, various magnetic recording media were obtained following the same procedures as above except that AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were used as matrix materials, and $SiO_2$ was used for comparison.

Figure 4:
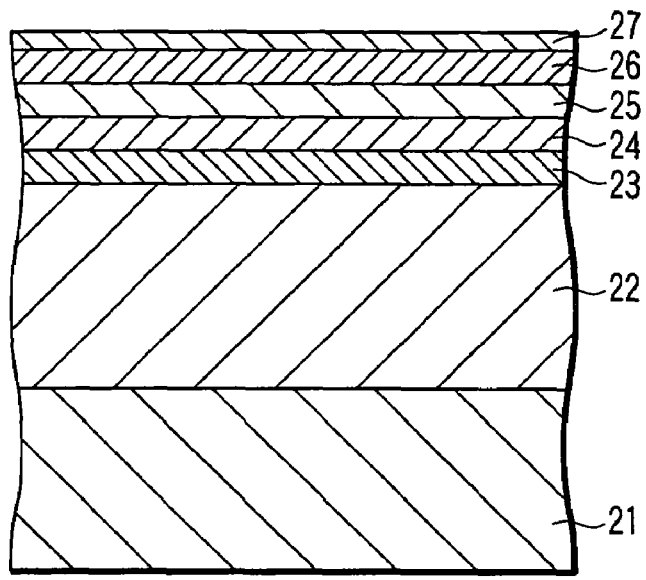
FIG. 4 is a sectional view showing the arrangement of the second example of the perpendicular magnetic recording medium of the present invention.

FIG. 4 is a sectional view showing an example of the obtained perpendicular magnetic recording media.

As shown in FIG. 4, this perpendicular magnetic recording medium has an arrangement in which a soft magnetic layer 22, first underlayer 23, second underlayer 24, third underlayer 25, perpendicular magnetic recording layer 26, and protective layer 27 are stacked in this order on a substrate 21.

The R/W characteristics and average grain sizes of the obtained media were evaluated in the same manner as in Embodiment 1. Table 3 below shows the SNRm values and average grain sizes when the addition amount was 10 mol %.

TABLE 3

| Compound | SNRm (dB) | dPW50 (nm) | Average grain size (nm) |
|---|---|---|---|
| $SiO_2$ | 18.5 | 108 | 12.3 |
| AlAs | 21.2 | 85 | 7.5 |
| AlP | 20.4 | 89 | 7.0 |
| AlSb | 20.2 | 81 | 7.4 |
| $Al_2S_3$ | 20.5 | 76 | 7.6 |
| $Al_2Se_3$ | 20.3 | 80 | 7.8 |
| $Al_2Te_3$ | 20.2 | 83 | 7.4 |
| CdS | 19.9 | 84 | 6.2 |
| CdSe | 19.9 | 85 | 6.8 |
| CdTe | 19.7 | 86 | 6.9 |
| GaAs | 20.8 | 87 | 7.1 |
| GaP | 20.9 | 88 | 7.5 |
| $Ga_2S_3$ | 20.1 | 89 | 7.4 |
| InP | 21.3 | 87 | 7.9 |
| $In_2S_3$ | 20.4 | 86 | 8.1 |
| ZnS | 20.8 | 85 | 7.6 |
| ZnTe | 20.5 | 89 | 7.6 |
| ZnSe | 20.3 | 87 | 7.5 |

As shown in Table 3, when compared to the medium in which the matrix material compound was $SiO_2$, the SNRm value was better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

Figure 5:
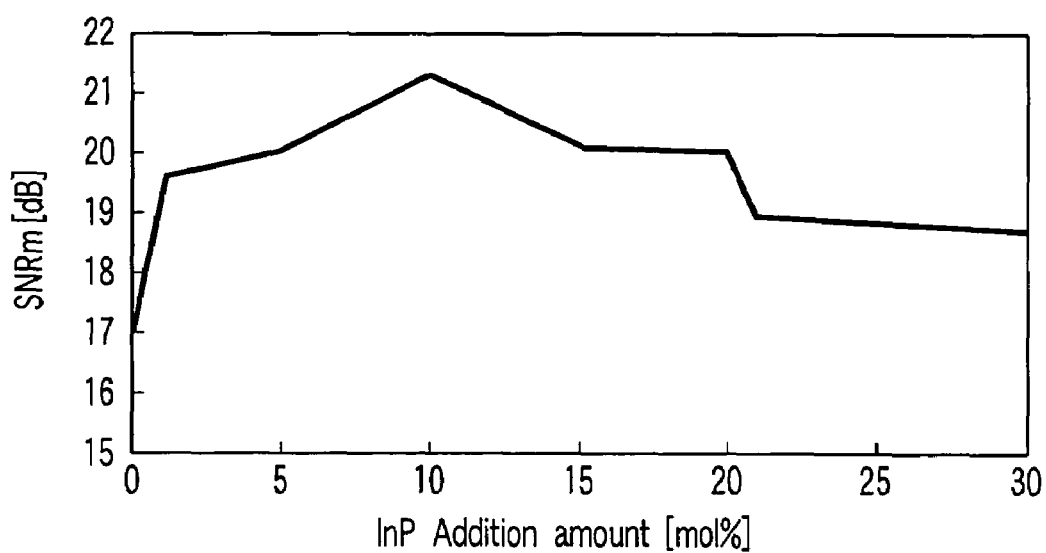
FIG. 5 is a graph showing the relationship between the InP addition amount and the SNRm value in Embodiment 2.

FIG. 5 shows the relationship between the addition amount and SNRm value when the matrix material compound was InP. Moreover, in one embodiment, it was found that the SNRm value increased when the addition amount was 1 to 20 mol %. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were added.

By using InP as the matrix material compound, magnetic recording media having various underlayer combinations shown in Table 4 below were formed and evaluated following the same procedures as above except that the first underlayer was replaced with Ta, Ni-40 at % Ta, or Ni-30 at % Nb, and the second underlayer was replaced with Ti or Co-30 at % Cr, and the third underlayer was replaced with Ru or Pt. Table 4 below shows the SNRm values when the InP addition amount was 10 mol %.

TABLE 4

| First underlayer | Second underlayer | Third underlayer | SNRm (dB) |
|---|---|---|---|
| Ta | Ti | Ru | 21.3 |
| Ta | Ti | Pt | 21.1 |
| Ta | Co70—Cr30 | Ru | 21.0 |
| Ta | Co70—Cr30 | Pt | 21.0 |
| Ni60—Ta40 | Ti | Ru | 21.4 |
| Ni60—Ta40 | Ti | Pt | 21.2 |
| Ni60—Ta40 | Co70—Cr30 | Ru | 21.0 |
| Ni60—Ta40 | Co70—Cr30 | Pt | 20.8 |
| Ni70—Nb30 | Ti | Ru | 20.9 |
| Ni70—Nb30 | Ti | Pt | 21.3 |
| Ni70—Nb30 | Co70—Cr30 | Ru | 21.1 |
| Ni70—Nb30 | Co70—Cr30 | Pt | 20.7 |

As shown in Table 4, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were added.

Embodiment 3

A 2.5-inch, hard-disk-like nonmagnetic glass substrate was prepared.

After a vacuum chamber of a sputtering apparatus was evacuated to $2\times10^{-5}$ Pa or less, a 200-nm thick $Co_{84}Zr_6Nb_{10}$ soft magnetic layer, 5-nm thick Ta layer, and 15-nm thick Ru layer were formed as a soft magnetic layer, first underlayer, and second underlayer, respectively, in a 0.67-Pa Ar ambient by using a $Co_{84}Zr_6Nb_{10}$ target, Ta target, and Ru target, respectively.

Subsequently, a 10-nm thick magnetic recording layer was formed in an 8-Pa Ar ambient by two-target simultaneous sputtering by using a Co-10 at % Cr-14 at % Pt target as a magnetic crystal grain material and an InP target as a matrix material. During this sputtering, the electric power to be supplied to each target was so controlled as to appropriately change the addition amount of the matrix material between 0 and 30 mol % with respect to the magnetic crystal grain material. A 7-nm thick C layer was then stacked as a protective layer in a 0.67-Pa Ar ambient. After the film formation, the surface of the protective layer was coated with a 13-Å thick PFPE lubricating agent by dipping, thereby obtaining a magnetic recording medium. The electric power applied to each target was 1,000 W.

In addition, various magnetic recording media were obtained following the same procedures as above except that AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were used as matrix materials, and $SiO_2$ was used for comparison.

Figure 6:
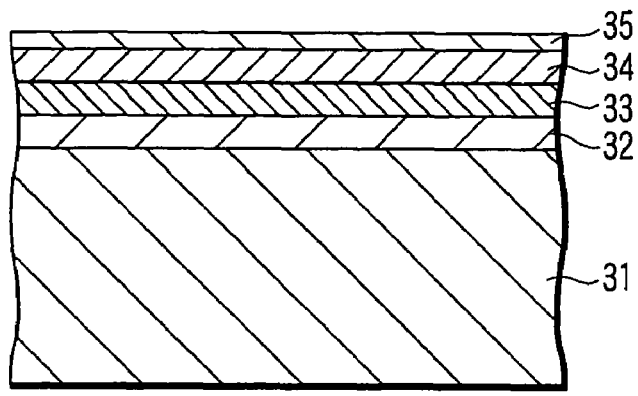
FIG. 6 is a sectional view showing the arrangement of the third example of the perpendicular magnetic recording medium of the present invention.

FIG. 6 is a sectional view showing an example of the obtained perpendicular magnetic recording media.

As shown in FIG. 6, this perpendicular magnetic recording medium has an arrangement in which a first underlayer 32, second underlayer 33, perpendicular magnetic recording layer 34, and protective layer 35 are stacked in this order on a substrate 31.

The R/W characteristics of the obtained media were evaluated in the same manner as in Embodiment 1 except that a combination of a ring head having a recording track width of 0.3 μm and an MR head having a reproducing track width of 0.2 μm was used as a magnetic head. The average grain sizes of these media were also measured.

Table 5 below shows the SNRm values when the addition amount was 10 mol %.

TABLE 5

| Compound | SNRm (dB) | dPW50 (nm) | Average grain size (nm) |
|---|---|---|---|
| $SiO_2$ | 17.5 | 110 | 13.2 |
| AlAs | 20.2 | 90 | 7.2 |
| AlP | 19.4 | 87 | 6.8 |
| AlSb | 19.2 | 85 | 6.9 |
| $Al_2S_3$ | 19.5 | 80 | 7.2 |
| $Al_2Se_3$ | 19.3 | 83 | 7.4 |
| $Al_2Te_3$ | 19.2 | 84 | 7.6 |
| CdS | 18.9 | 89 | 7.6 |
| CdSe | 19.0 | 83 | 7.9 |
| CdTe | 19.1 | 79 | 7.9 |
| GaAs | 20.1 | 76 | 8.1 |
| GaP | 19.7 | 78 | 8.3 |
| $Ga_2S_3$ | 19.0 | 77 | 8.6 |
| InP | 20.1 | 74 | 8.0 |
| $In_2S_3$ | 19.3 | 76 | 8.6 |
| ZnS | 19.9 | 77 | 8.0 |
| ZnTe | 19.6 | 78 | 8.9 |
| ZnSe | 19.0 | 74 | 7.6 |

As shown in Table 5, when compared to the medium in which the matrix material compound was $SiO_2$, the SNRm value was better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

Figure 8:
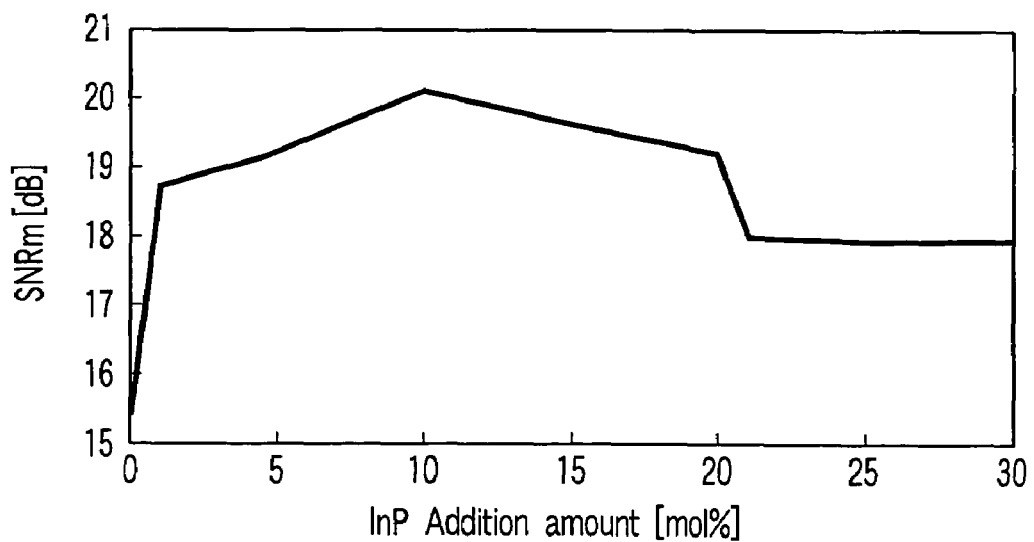
FIG. 8 is a graph showing the relationship between the InP addition amount and the SNRm value in Embodiment 3.

FIG. 8 shows the relationship between the addition amount and SNRm value when the matrix material compound was InP. Moreover in one embodiment, it was found that the SNRm value increased when the addition amount was 1 to 20 mol %. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were added.

By using InP as the matrix material compound, magnetic recording media having various underlayer combinations shown in Table 6 below were formed and evaluated following the same procedures as above except that the first underlayer was replaced with Ta, Ni-40 at % Ta, or Ni-30 at % Nb, and the second underlayer was replaced with Ru, Co-30 at % Cr, or Ti. Table 6 below shows the SNRm values when the InP addition amount was 10 mol %.

TABLE 6

| First underlayer | Second underlayer | SNRm (dB) |
|---|---|---|
| Ta | Ru | 20.1 |
| Ta | Co70—Cr30 | 19.7 |
| Ta | Ti | 19.8 |

TABLE 6-continued

| First underlayer | Second underlayer | SNRm (dB) |
|---|---|---|
| Ni60—Ta40 | Ru | 20.0 |
| Ni60—Ta40 | Co70—Cr30 | 20.3 |
| Ni60—Ta40 | Ti | 20.3 |
| Ni70—Nb30 | Ru | 20.6 |
| Ni70—Nb30 | Co70—Cr30 | 19.8 |
| Ni70—Nb30 | Ti | 19.7 |

As shown in Table 6, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were added.

Embodiment 4

A 2.5-inch, hard-disk-like nonmagnetic glass substrate was prepared.

After a vacuum chamber of a sputtering apparatus was evacuated to $2\times10^{-5}$ Pa or less, a 15-nm thick Ru layer was stacked as a first underlayer in a 0.67-Pa Ar ambient by using an Ru target.

Subsequently, a 10-nm thick magnetic recording layer was formed in an 8-Pa Ar ambient by two-target simultaneous sputtering by using a Co-10 at % Cr-14 at % Pt target as a magnetic crystal grain material and an InP target as a matrix material. During this sputtering, the electric power to be supplied to each target was so controlled as to appropriately change the addition amount of the matrix material between 0 and 30 mol % with respect to the magnetic crystal grain material. A 7-nm thick C layer was then stacked as a protective layer in a 0.67-Pa Ar ambient. After the film formation, the surface of the protective layer was coated with a 13-Å thick PFPE lubricating agent by dipping, thereby obtaining a magnetic recording medium. The electric power applied to each target was 1,000 W.

In addition, various magnetic recording media were obtained following the same procedures as above except that AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were used as matrix materials, and $SiO_2$ was used for comparison.

Figure 7:
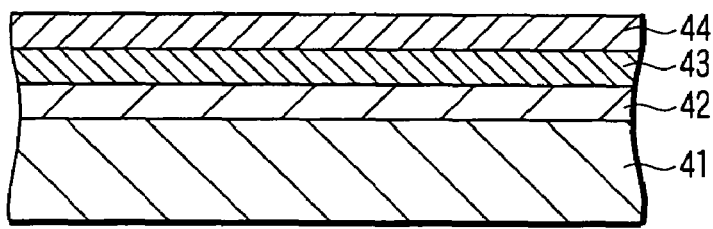
FIG. 7 is a sectional view showing the arrangement of the fourth example of the perpendicular magnetic recording medium of the present invention.

FIG. 7 is a sectional view showing an example of the obtained perpendicular magnetic recording media.

As shown in FIG. 7, this perpendicular magnetic recording medium has an arrangement in which an underlayer 42, perpendicular magnetic recording layer 43, and protective layer 44 are stacked in this order on a substrate 41.

The R/W characteristics of the obtained media were evaluated in the same manner as in Embodiment 3 except that a combination of a ring head having a recording track width of 0.3 μm and an MR head having a reproducing track width of 0.2 μm was used as a magnetic head. The average grain sizes of these media were also measured. Table 7 below shows the obtained results.

TABLE 7

| Compound | SNRm (dB) | dPW50 (nm) | Average grain size (nm) |
|---|---|---|---|
| $SiO_2$ | 16.5 | 126 | 13.1 |
| AlAs | 19.1 | 87 | 7.9 |

TABLE 7-continued

| Compound | SNRm (dB) | dPW50 (nm) | Average grain size (nm) |
|---|---|---|---|
| AlP | 19.0 | 86 | 8.6 |
| AlSb | 19.2 | 82 | 8.4 |
| $Al_2S_3$ | 18.5 | 80 | 7.6 |
| $Al_2Se_3$ | 19.1 | 75 | 9.0 |
| $Al_2Te_3$ | 18.6 | 76 | 8.4 |
| CdS | 18.9 | 77 | 8.9 |
| CdSe | 18.0 | 79 | 8.6 |
| CdTe | 19.1 | 75 | 8.2 |
| GaAs | 18.9 | 89 | 8.1 |
| GaP | 19.4 | 87 | 8.7 |
| $Ga_2S_3$ | 18.7 | 88 | 8.3 |
| InP | 19.8 | 85 | 8.6 |
| $In_2S_3$ | 19.2 | 82 | 8.6 |
| ZnS | 18.6 | 83 | 7.6 |
| ZnTe | 19.0 | 80 | 7.7 |
| ZnSe | 18.6 | 81 | 8.5 |

As shown in Table 7, when compared to the medium to which $SiO_2$ was added, both the SNRm value and dPW50 value were better and the crystal grain size was smaller when any of AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe was added.

FIG. 9 shows the relationship between the addition amount and SNRm value when the matrix material compound was InP. Moreover in one embodiment, it was found that the SNRm value increased when the addition amount was 1 to 20 mol %. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were added.

By using InP as the matrix material, compound, magnetic recording media having various underlayers shown in Table 8 below were formed and evaluated following the same procedures as above except that the underlayer was replaced with Pt, Co-30 at % Cr, or Ti. Table 8 below shows the SNRm values when the InP addition amount was 10 mol %.

TABLE 8

| Underlayer | SNRm (dB) |
|---|---|
| Pt | 19.6 |
| Co70—Cr30 | 19.7 |
| Ti | 19.3 |

As shown in Table 8, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, $In_2S_3$, ZnS, ZnTe, and ZnSe were added.

Embodiment 5

Magnetic recording media using various matrix materials were obtained following the same procedures as in Embodiment 2 except that an 8-nm thick Ni-50 at % Al layer was formed as a first underlayer, a 15-nm thick Pt layer was formed as a second underlayer, Fe-48 at % Pt-2 at % Cu was used as magnetic crystal grains, $ZrO_2$ was used as a comparative matrix material instead of $SiO_2$, the thickness of a magnetic recording layer was changed to 10 nm, and, while this magnetic recording layer was formed, the substrate was heated by an infrared heater so that the substrate temperature was 300° C.

The R/W characteristics of the obtained media were evaluated in the same manner as in Embodiment 1.

Table 9 below shows the SNRm values when the addition amount was 10 mol %.

TABLE 9

| Compound | SNRm (dB) | dPW50 (nm) | Average grain size (nm) |
|---|---|---|---|
| $ZrO_2$ | 17.5 | 119 | 13.3 |
| AlAs | 19.6 | 85 | 7.1 |
| AlP | 19.0 | 86 | 6.9 |
| AlSb | 18.6 | 87 | 7.3 |
| $Al_2S_3$ | 18.5 | 79 | 7.2 |
| $Al_2Se_3$ | 18.8 | 84 | 7.4 |
| $Al_2Te_3$ | 19.0 | 86 | 8.0 |
| CdS | 18.9 | 83 | 7.6 |
| CdSe | 18.6 | 87 | 7.5 |
| CdTe | 18.7 | 88 | 7.0 |
| GaAs | 19.8 | 79 | 6.9 |
| GaP | 19.2 | 78 | 7.1 |
| $Ga_2S_3$ | 18.5 | 81 | 7.5 |
| InP | 19.4 | 86 | 7.3 |
| $In_2S_3$ | 18.9 | 85 | 8.0 |
| ZnS | 19.3 | 87 | 8.1 |
| ZnTe | 18.9 | 81 | 7.6 |
| ZnSe | 19.5 | 80 | 7.2 |

As shown in Table 9, when compared to the medium in which the matrix material compound was $ZrO_2$, the SNRm value was better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

FIG. 10 shows the relationship between the addition amount and SNRm value when the matrix material compound was GaAs. moreover in one embodiment it was found that the SNRm value increased when the addition amount was 1 to 20 mol %. Similar tendencies were found when AlAs, AlP, AlSb, $Al_2S_3$, $Al_2Se_3$, $Al_2Te_3$, CdS, CdSe, CdTe, GaP, $Ga_2S_3$, InP, $In_2S_3$, ZnS, ZnTe, and ZnSe were added.

By using GaAs as the matrix material compound, magnetic recording media having various underlayer combinations shown in Table 10 below were formed and evaluated following the same procedures as above except that the first underlayer was replaced with Ni-50 at % Al or MgO, and the second underlayer was replaced with Pt, Cr, or Pd. Table 10 below shows the SNRm values when the GaAs addition amount was 10 mol %.

TABLE 10

| First underlayer | Second underlayer | SNRm (dB) |
|---|---|---|
| Ni50—Al50 | Pt | 19.8 |
| Ni50—Al50 | Pd | 19.6 |
| Ni50—Al50 | Cr | 19.4 |
| MgO | Pt | 19.6 |
| MgO | Pd | 19.7 |
| MgO | Cr | 19.5 |

As shown in Table 10, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaP, InP, $In_2S_3$, ZnS, ZnTe, and ZnSe were added.

Embodiment 6

Magnetic recording media using various matrix materials were obtained following the same procedures as in Embodiment 1 except that a 5-nm thick Ni-50 at % Al layer, 20-nm thick Cr layer, and 10-nm thick Pt layer were formed as first, second, and third underlayers, respectively, Fe-48 at % Pt-2 at % Cu was used as magnetic crystal grains, $ZrO_2$ was used as a comparative matrix material instead of $SiO_2$, the thickness of a magnetic recording layer was changed to 5 nm, and, while this magnetic recording layer was formed, the substrate was heated by an infrared heater so that the substrate temperature was 300° C.

The R/W characteristics of the obtained media were evaluated in the same manner as in Embodiment 1.

Table 11 below shows the SNRm values when the addition amount was 10 mol %.

TABLE 11

| Compound | SNRm (dB) | dPW50 (nm) | Average grain size (nm) |
|---|---|---|---|
| $ZrO_2$ | 17.9 | 126 | 11.9 |
| AlAs | 19.8 | 87 | 8.8 |
| AlP | 19.5 | 85 | 7.5 |
| AlSb | 19.2 | 88 | 7.6 |
| $Al_2S_3$ | 18.9 | 81 | 7.3 |
| $Al_2Se_3$ | 19.3 | 79 | 8.2 |
| $Al_2Te_3$ | 19.6 | 76 | 7.4 |
| CdS | 19.3 | 85 | 7.3 |
| CdSe | 19.1 | 83 | 7.1 |
| CdTe | 19.0 | 84 | 7.6 |
| GaAs | 20.1 | 81 | 7.9 |
| GaP | 19.7 | 88 | 8.5 |
| $Ga_2S_3$ | 19.0 | 76 | 7.3 |
| InP | 19.9 | 75 | 7.4 |
| $In_2S_3$ | 18.9 | 79 | 7.6 |
| ZnS | 19.8 | 85 | 7.2 |
| ZnTe | 19.4 | 82 | 7.0 |
| ZnSe | 20.0 | 83 | 7.0 |

As shown in Table 11, when compared to the medium in which the matrix material compound was $ZrO_2$, the SNRm value was better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

Figure 11:
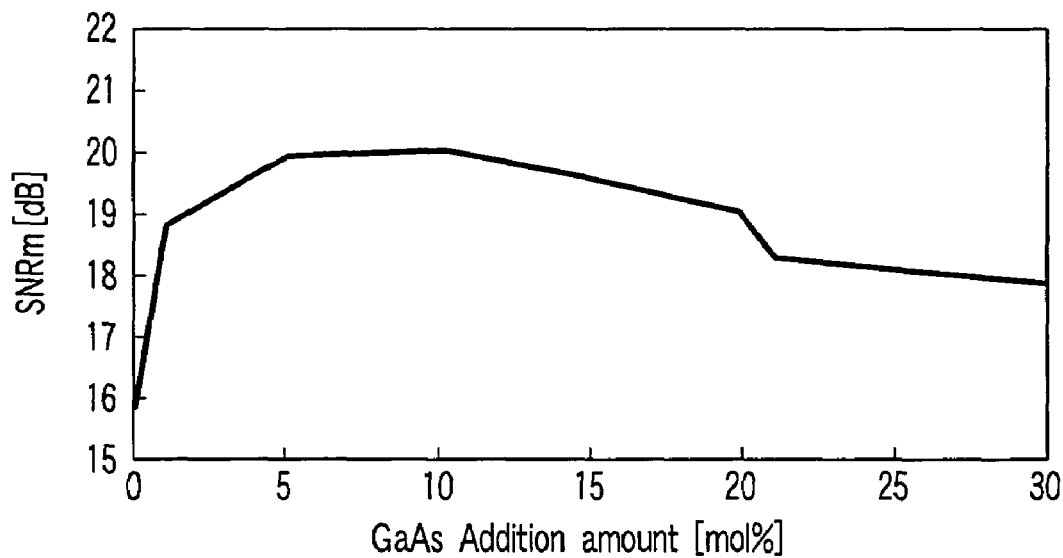
FIG. 11 is a graph showing the relationship between the GaAs addition amount and the SNRm value in Embodiment 6.

FIG. 11 shows the relationship between the addition amount and SNRm value when the matrix material compound was GaAs. Moreover in one embodiment it was found that the SNRm value increased when the addition amount was 1 to 20 mol %. Similar tendencies were found when AlAs, AlP, AlSb, $Al_2S_3$, $Al_2Se_3$, $Al_2Te_3$, CdS, CdSe, CdTe, GaP, $Ga_2S_3$, InP, $In_2S_3$, ZnS, ZnTe, and ZnSe were added.

By using GaAs as the matrix material compound, magnetic recording media having various underlayer combinations shown in Table 12 below were formed and evaluated following the same procedures as above except that the first underlayer was replaced with Ni-50 at % Al or MgO, the second underlayer was replaced with Cr or Fe, and the third underlayer was replaced with Pt or Pd. Table 12 below shows the SNRm values when the GaAs addition amount was 10 mol %.

TABLE 12

| First underlayer | Second underlayer | Third underlayer | SNRm (dB) |
|---|---|---|---|
| Ni50—Al50 | Cr | Pt | 20.1 |
| Ni50—Al50 | Cr | Pd | 19.9 |
| Ni50—Al50 | Fe | Pt | 20.0 |
| Ni50—Al50 | Fe | Pd | 19.8 |
| MgO | Cr | Pt | 20.0 |
| MgO | Cr | Pd | 20.2 |
| MgO | Fe | Pt | 19.9 |
| MgO | Fe | Pd | 20.1 |
| MgO | Cr | Pt | 20.2 |

As shown in Table 12, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaP, $Ga_2S_3$, InP, $In_2S_3$, ZnS, ZnTe, and ZnSe were added.

Embodiment 7

Magnetic recording media using various matrix materials were obtained following the same procedures as in Embodiment 3 except that a 5-nm thick Ni-50 at % Al layer was formed as a first underlayer, a 15-nm thick Pt layer was formed as a second underlayer, Fe-48 at % Pt-2 at % Cu was used as magnetic crystal grains, $ZrO_2$ was used as a comparative matrix material instead of $SiO_2$, the thickness of a magnetic recording layer was changed to 5 nm, and, while this magnetic recording layer was formed, the substrate was heated by an infrared heater so that the substrate temperature was 300° C.

The R/W characteristics of the obtained media were evaluated in the same manner as in Embodiment 3.

Table 13 below shows the SNRm values when the addition amount was 10 mol %.

TABLE 13

| Compound | SNRm (dB) | dPW50 (nm) | Average grain size (nm) |
|---|---|---|---|
| $ZrO_2$ | 17.4 | 115 | 13.5 |
| AlAs | 19.3 | 87 | 8.0 |
| AlP | 19.0 | 85 | 8.2 |
| AlSb | 18.6 | 83 | 7.6 |
| $Al_2S_3$ | 18.2 | 73 | 8.6 |
| $Al_2Se_3$ | 18.7 | 86 | 7.3 |
| $Al_2Te_3$ | 19.0 | 74 | 7.4 |
| CdS | 19.0 | 73 | 7.6 |
| CdSe | 18.4 | 72 | 7.9 |
| CdTe | 18.7 | 76 | 7.8 |
| GaAs | 19.6 | 79 | 7.4 |
| GaP | 19.2 | 81 | 7.6 |
| $Ga_2S_3$ | 18.5 | 75 | 7.2 |
| InP | 19.3 | 73 | 7.0 |
| $In_2S_3$ | 18.5 | 86 | 8.4 |
| ZnS | 19.1 | 88 | 7.6 |
| ZnTe | 19.0 | 87 | 7.3 |
| ZnSe | 19.6 | 75 | 7.4 |

As shown in Table 13, when compared to the medium to which $ZrO_2$ was added, the SNRm value was better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

Figure 12:
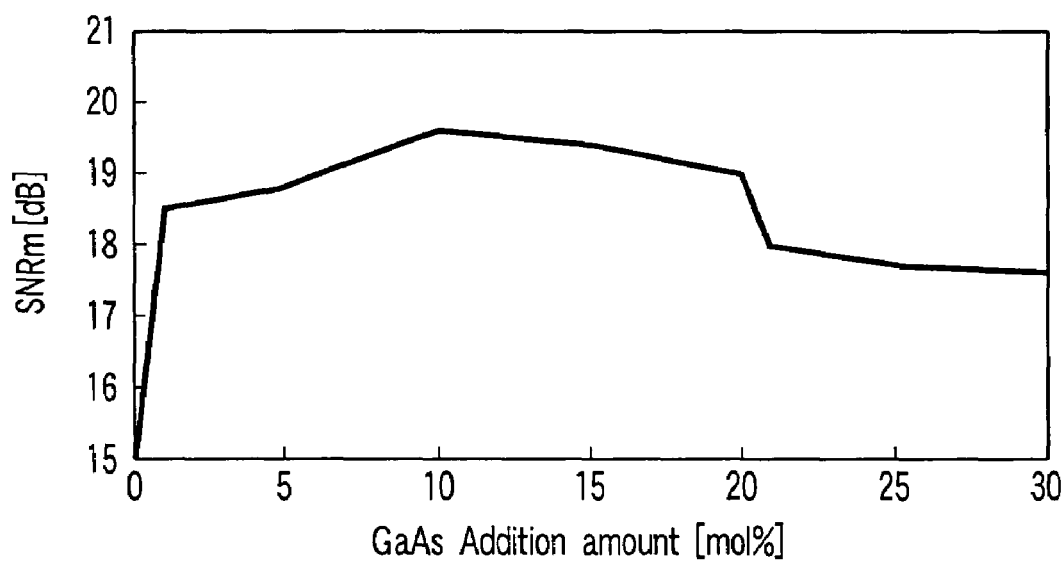
FIG. 12 is a graph showing the relationship between the GaAs addition amount and the SNRm value in Embodiment 7.

FIG. 12 shows the relationship between the addition amount and SNRm value when the matrix compound was GaAs.

Moreover in one embodiment it was found that the SNRm value increased when the addition amount was 1 to 20 mol %. Similar tendencies were found when AlAs, AlP, AlSb, $Al_2S_3$, $Al_2Se_3$, $Al_2Te_3$, CdS, CdSe, CdTe, GaP, $Ga_2S_3$, InP, $In_2S_3$, ZnS, ZnTe, and ZnSe were added.

By using GaAs as the matrix material compound, magnetic recording media having various underlayer combinations shown in Table 14 below were formed and evaluated following the same procedures as above except that the first underlayer was replaced with Ni-50 at % Al or MgO, and the second underlayer was replaced with Pt, Cr, or Pd.

Table 14 below shows the SNRm values when the GaAs addition amount was 10 mol %.

TABLE 14

| First underlayer | Second underlayer | SNRm (dB) |
| --- | --- | --- |
| Ni50—Al50 | Pt | 19.6 |
| Ni50—Al50 | Pd | 19.4 |
| Ni50—Al50 | Cr | 19.2 |
| MgO | Pt | 19.7 |
| MgO | Pd | 19.2 |
| MgO | Cr | 19.1 |

As shown in Table 14, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaP, $Ga_2S_3$, InP, $In_2S_3$, ZnS, ZnTe, and ZnSe were added.

Embodiment 8

Magnetic recording media using various matrix materials were obtained following the same procedures as in Embodiment 4 except that a 15-nm thick Pt layer was formed as an underlayer, Fe-48 at % Pt-2 at % Cu was used as magnetic crystal grains, $ZrO_2$ was used as a comparative matrix material instead of $SiO_2$, the thickness of a magnetic recording layer was changed to 5 nm, and, while this magnetic recording layer was formed, the substrate was heated by an infrared heater so that the substrate temperature was 300° C.

The R/W characteristics of the obtained media were evaluated in the same manner as in Embodiment 3.

Table 15 below shows the SNRm values when the addition amount was 10 mol %.

TABLE 15

| Compound | SNRm (dB) | dPW50 (nm) | Average grain size (nm) |
| --- | --- | --- | --- |
| $ZrO_2$ | 16.3 | 120 | 14.0 |
| AlAs | 17.8 | 89 | 8.2 |
| AlP | 18.0 | 85 | 8.2 |
| AlSb | 17.6 | 83 | 8.0 |
| $Al_2S_3$ | 18.2 | 80 | 8.6 |
| $Al_2Se_3$ | 18.0 | 86 | 7.3 |
| $Al_2Te_3$ | 18.3 | 74 | 8.3 |
| CdS | 17.9 | 84 | 7.6 |
| CdSe | 18.4 | 85 | 7.9 |
| CdTe | 18.1 | 76 | 7.8 |
| GaAs | 18.5 | 86 | 8.6 |
| GaP | 17.9 | 81 | 7.6 |
| $Ga_2S_3$ | 18.1 | 86 | 7.2 |
| InP | 18.3 | 80 | 8.6 |
| $In_2S_3$ | 18.0 | 86 | 8.4 |
| ZnS | 18.2 | 88 | 7.6 |
| ZnTe | 18.0 | 87 | 8.2 |
| ZnSe | 18.0 | 79 | 7.4 |

As shown in Table 15, when compared to the medium to which $ZrO_2$ was added, the SNRm value was better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

FIG. 13 shows the relationship between the addition amount and SNRm value when the matrix compound was GaAs. Moreover in one embodiment it was found that the SNRm value increased when the addition amount was 1 to 20 mol %. Similar tendencies were found when AlAs, AlP, AlSb, $Al_2S_3$, $Al_2Se_3$, $Al_2Te_3$, CdS, CdSe, CdTe, GaP, $Ga_2S_3$, InP, $In_2S_3$, ZnS, ZnTe, and ZnSe were added.

By using GaAs as the matrix material compound, magnetic recording media having various underlayers shown in Table 16 below were formed and evaluated following the same procedures as above except that the underlayer was replaced with Ni-50 at % Al, MgO, Cr, or Pd.

Table 16 below shows the SNRm values when the GaAs addition amount was 10 mol %.

TABLE 16

| Underlayer | SNRm (dB) |
| --- | --- |
| MgO | 18.0 |
| Pd | 18.2 |
| Ni50—Al50 | 17.8 |
| Cr | 18.1 |

As shown in Table 16, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaP, $Ga_2S_3$, InP, $In_2S_3$, ZnS, ZnTe, and ZnSe were added.

Embodiment 9

Magnetic recording media using various matrix materials were obtained following the same procedures as in Embodiment 5 except that Fe-5 at % Co-50 at % Pd was used as magnetic crystal grains, and TiN was used as a comparative matrix material instead of $ZrO_2$.

The R/W characteristics of the obtained media were evaluated in the same manner as in Embodiment 1.

Table 17 below shows the SNRm values when the addition amount was 10 mol %.

TABLE 17

| Compound | SNRm (dB) | dPW50 (nm) | Average grain size (nm) |
| --- | --- | --- | --- |
| TiN | 17.5 | 128 | 12.6 |
| AlAs | 19.5 | 84 | 8.2 |
| AlP | 18.4 | 86 | 8.9 |
| AlSb | 18.5 | 89 | 8.5 |
| $Al_2S_3$ | 19.1 | 82 | 8.1 |
| $Al_2Se_3$ | 18.6 | 73 | 8.6 |
| $Al_2Te_3$ | 18.4 | 84 | 8.2 |
| CdS | 18.5 | 76 | 8.0 |
| CdSe | 19.0 | 84 | 8.0 |
| CdTe | 19.5 | 76 | 8.6 |
| GaAs | 19.2 | 79 | 7.9 |
| GaP | 19.5 | 89 | 7.6 |
| $Ga_2S_3$ | 18.7 | 85 | 7.8 |
| InP | 19.2 | 71 | 8.2 |
| $In_2S_3$ | 18.7 | 73 | 8.3 |
| ZnS | 19.6 | 74 | 7.9 |
| ZnTe | 19.2 | 75 | 7.7 |
| ZnSe | 19.5 | 77 | 7.6 |

As shown in Table 17, when compared to the medium in which the matrix material compound was TiN, the SNRm value was better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

FIG. 14 shows the relationship between the addition amount and SNRm value when the matrix material compound was ZnSe.

Moreover in one embodiment, it was found that the SNRm value increased when the addition amount was 1 to 20 mol %. Similar tendencies were found when AlAs, AlP, AlSb, $Al_2S_3$, $Al_2Se_3$, $Al_2Te_3$, CdS, CdSe, CdTe, GaP, $Ga_2S_3$, InP, $In_2S_3$, ZnS, and ZnTe were added.

By using ZnSe as the additive, magnetic recording media having various underlayer combinations shown in Table 18 below were formed and evaluated by replacing the first and second underlayers in the same manner as in Embodiment 5. Table 18 below shows the SNRm values when the ZnSe addition amount was 10 mol %.

TABLE 18

| First underlayer | Second underlayer | SNRm (dB) |
|---|---|---|
| Ni50—Al50 | Pt | 19.5 |
| Ni50—Al50 | Pd | 19.4 |
| Ni50—Al50 | Cr | 19.2 |
| MgO | Pt | 19.3 |
| MgO | Pd | 19.2 |
| MgO | Cr | 19.1 |

As shown in Table 18, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, and ZnTe were added.

Embodiment 10

Magnetic recording media using various matrix materials were obtained following the same procedures as in Embodiment 6 except that Fe-5 at % Co-50 at % Pd was used as magnetic crystal grains, and TiN was used as a comparative matrix material instead of $ZrO_2$.

The R/W characteristics of the obtained media were evaluated in the same manner as in Embodiment 1.

Table 19 below shows the SNRm values when the addition amount was 10 mol %.

TABLE 19

| Compound | SNRm (dB) | dPW50 (nm) | Average grain size (nm) |
|---|---|---|---|
| TiN | 18.3 | 128 | 13.4 |
| AlAs | 20.2 | 89 | 7.1 |
| AlP | 19.2 | 85 | 7.6 |
| AlSb | 19.3 | 83 | 8.2 |
| $Al_2S_3$ | 19.6 | 86 | 7.4 |
| $Al_2Se_3$ | 19.2 | 81 | 7.5 |
| $Al_2Te_3$ | 19.0 | 79 | 8.2 |
| CdS | 19.1 | 86 | 8.6 |
| CdSe | 19.7 | 78 | 8.4 |
| CdTe | 20.1 | 85 | 8.1 |
| GaAs | 20.0 | 86 | 7.6 |
| GaP | 20.1 | 88 | 7.5 |
| $Ga_2S_3$ | 19.3 | 89 | 8.3 |
| InP | 19.8 | 76 | 7.2 |

TABLE 19-continued

| Compound | SNRm (dB) | dPW50 (nm) | Average grain size (nm) |
|---|---|---|---|
| $In_2S_3$ | 19.5 | 85 | 7.7 |
| ZnS | 20.1 | 74 | 7.6 |
| ZnTe | 20.0 | 73 | 8.5 |
| ZnSe | 20.3 | 81 | 7.1 |

As shown in Table 19, when compared to the medium in which the matrix material compound was TiN, the SNRm value was better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

Figure 15:
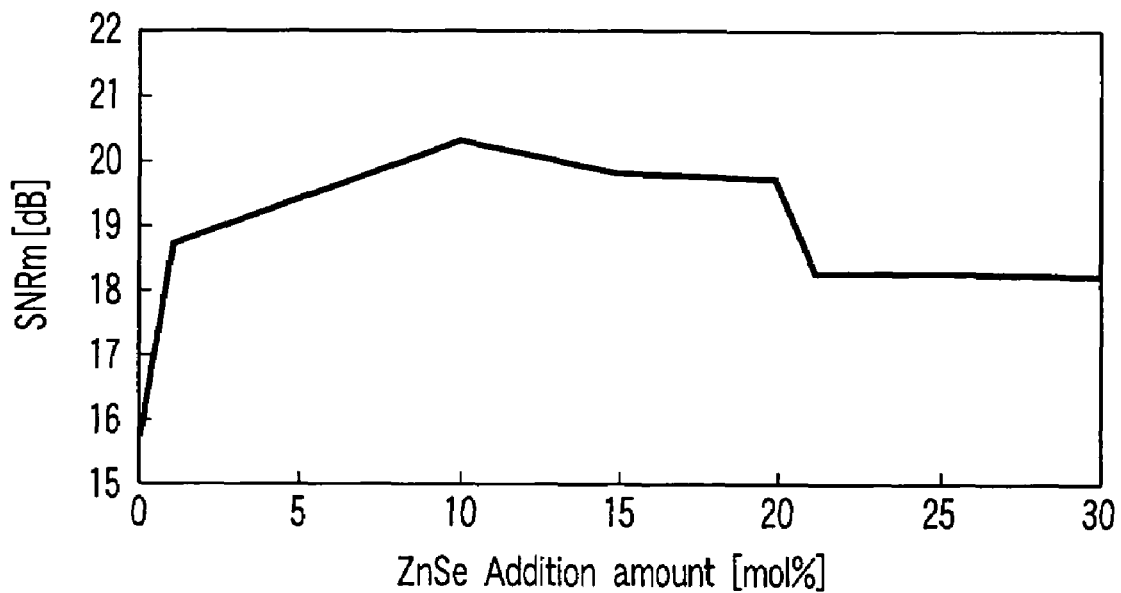
FIG. 15 is a graph showing the relationship between the ZnSe addition amount and the SNRm value in Embodiment 10.

FIG. 15 shows the relationship between the addition amount and SNRm value when the matrix material compound was ZnSe.

Moreover in one embodiment, it was found that the SNRm value increased when the addition amount was 1 to mol %. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, and ZnTe were added.

By using ZnSe as the additive, magnetic recording media having various underlayer combinations shown in Table 20 below were formed and evaluated by replacing the first, second, and third underlayers in the same manner as in Embodiment 6. Table 20 below shows the SNRm values when the ZnSe addition amount was 10 mol %.

TABLE 20

| First underlayer | Second underlayer | Third underlayer | SNRm (dB) |
|---|---|---|---|
| Ni50—Al50 | Cr | Pt | 20.3 |
| Ni50—Al50 | Cr | Pd | 19.5 |
| Ni50—Al50 | Fe | Pt | 20.1 |
| Ni50—Al50 | Fe | Pd | 19.7 |
| MgO | Cr | Pt | 19.9 |
| MgO | Cr | Pd | 19.8 |
| MgO | Fe | Pt | 19.9 |
| MgO | Fe | Pd | 19.6 |
| MgO | Cr | Pt | 20.0 |

As shown in Table 20, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, and ZnTe were added.

Embodiment 11

Magnetic recording media using various matrix materials were obtained following the same procedures as in Embodiment 3 except that a disk-like Si substrate was used as a substrate, a 5-nm thick MgO layer was formed as a first underlayer, a 15-nm thick Pd layer was formed as a second underlayer, Fe-50 at % Pd was used as magnetic crystal grains, and TiN was used as a comparative matrix material instead of $ZrO_2$.

The R/W characteristics of the obtained media were evaluated in the same manner as in Embodiment 3.

Table 21 below shows the SNRm values when the addition amount was 10 mol %.

TABLE 21

| Compound | SNRm (dB) | dPW50 (nm) | Average grain size (nm) |
|---|---|---|---|
| TiN | 17.0 | 130 | 13.7 |
| AlAs | 18.9 | 87 | 7.7 |
| AlP | 17.9 | 88 | 8.6 |
| AlSb | 18.0 | 82 | 8.4 |
| $Al_2S_3$ | 18.5 | 83 | 7.5 |
| $Al_2Se_3$ | 18.0 | 75 | 8.9 |
| $Al_2Te_3$ | 17.9 | 76 | 8.4 |
| CdS | 17.9 | 78 | 8.8 |
| CdSe | 18.4 | 79 | 8.6 |
| CdTe | 18.9 | 74 | 8.2 |
| GaAs | 18.8 | 89 | 8.1 |
| GaP | 19.0 | 86 | 8.7 |
| $Ga_2S_3$ | 18.1 | 88 | 8.3 |
| InP | 18.7 | 84 | 8.9 |
| $In_2S_3$ | 18.2 | 82 | 8.6 |
| ZnS | 19.0 | 83 | 7.5 |
| ZnTe | 18.6 | 72 | 7.9 |
| ZnSe | 19.2 | 81 | 8.4 |

As shown in Table 21, when compared to the medium in which the matrix material compound was TiN, the SNRm value was better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

Figure 16:
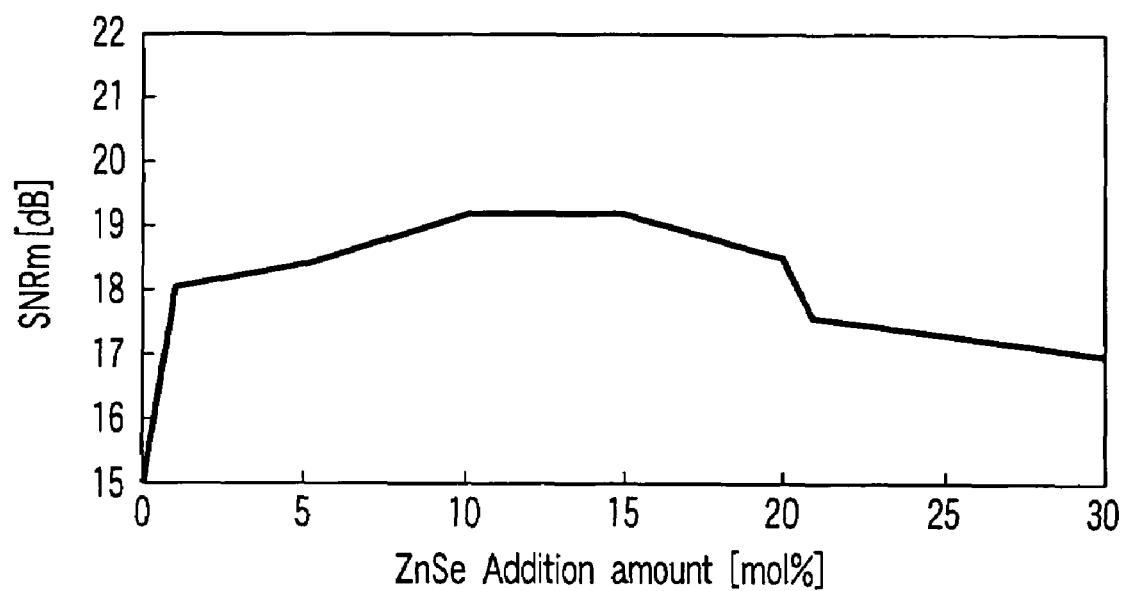
FIG. 16 is a graph showing the relationship between the ZnSe addition amount and the SNRm value in Embodiment 11.

FIG. 16 shows the relationship between the addition amount and SNRm value when the matrix material compound was ZnSe.

Moreover in one embodiment, it was found that the SNRm value increased when the addition amount was 1 to mol %. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, and ZnTe were added.

By using ZnSe as the additive, magnetic recording media having various underlayer combinations shown in Table 22 below were formed and evaluated by replacing the first and second underlayers in the same manner as in Embodiment 7. Table 22 below shows the SNRm values when the ZnSe addition amount was 10 mol %.

TABLE 22

| First underlayer | Second underlayer | SNRm (dB) |
|---|---|---|
| Ni50—Al50 | Pt | 19.2 |
| Ni50—Al50 | Pd | 19.0 |
| Ni50—Al50 | Cr | 18.9 |
| MgO | Pt | 19.1 |
| MgO | Pd | 18.8 |
| MgO | Cr | 18.7 |

As shown in Table 22, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, and ZnTe were added.

Embodiment 12

Magnetic recording media using various matrix materials were obtained following the same procedures as in Embodiment 3 except that a disk-like Si substrate was used as a substrate, a 10-nm thick Pd layer was formed as a first underlayer, Fe-50 at % Pd was used as magnetic crystal grains, and TiN was used as a comparative matrix material instead of $ZrO_2$.

The R/W characteristics of the obtained media were evaluated in the same manner as in Embodiment 3.

Table 23 below shows the SNRm values when the addition amount was 10 mol %.

TABLE 23

| Compound | SNRm (dB) | dPW50 (nm) | Average grain size (nm) |
|---|---|---|---|
| TiN | 16.2 | 133 | 13.9 |
| AlAs | 17.3 | 83 | 7.8 |
| AlP | 17.9 | 88 | 8.5 |
| AlSb | 17.6 | 82 | 7.9 |
| $Al_2S_3$ | 17.9 | 80 | 7.9 |
| $Al_2Se_3$ | 17.6 | 79 | 8.6 |
| $Al_2Te_3$ | 17.9 | 76 | 8.6 |
| CdS | 17.9 | 80 | 8.7 |
| CdSe | 17.4 | 79 | 8.9 |
| CdTe | 17.6 | 81 | 8.1 |
| GaAs | 18.0 | 81 | 8.6 |
| GaP | 17.8 | 86 | 8.9 |
| $Ga_2S_3$ | 17.6 | 89 | 8.6 |
| InP | 17.9 | 84 | 8.8 |
| $In_2S_3$ | 18.0 | 88 | 8.9 |
| ZnS | 17.7 | 86 | 8.0 |
| ZnTe | 17.9 | 76 | 7.6 |
| ZnSe | 18.0 | 79 | 8.0 |

As shown in Table 23, when compared to the medium in which the matrix material compound was TiN, the SNRm value was better when any of AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, ZnTe, and ZnSe was added.

FIG. 17 shows the relationship between the addition amount and SNRm value when the matrix material compound was ZnSe.

Moreover in one embodiment, it was found that the SNRm value increased when the addition amount was 1 to 20 mol %. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, and ZnTe were added.

By using ZnSe as the additive, magnetic recording media having various underlayers shown in Table 24 below were formed and evaluated by replacing the underlayer with Pt, Cr, Ni-50 at % Al, or MgO. Table 24 below shows the SNRm values when the ZnSe addition amount was 10 mol %.

TABLE 24

| Underlayer | SNRm (dB) |
|---|---|
| Pt | 18.0 |
| MgO | 17.8 |
| Ni50—Al50 | 17.6 |
| Cr | 17.9 |

As shown in Table 24, favorable SNRm values were obtained regardless of the types of underlayers, so all these underlayers were suitable. Similar tendencies were found when AlAs, AlP, AlSb, $Al_2S_3$, $Al_2Se_3$, $Al_2Te_3$, CdS, CdSe, CdTe, GaAs, GaP, $Ga_2S_3$, InP, $In_2S_3$, ZnS, and ZnTe were added.

In the present invention as has been described above, the grain size of magnetic crystal grains can be decreased without disturbing the crystallinity and orientation of the magnetic crystal grains. Since a perpendicular magnetic recording medium having good SNR characteristics is obtained, high-density recording can be performed.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A perpendicular magnetic recording medium comprising:
   a substrate;
   an underlayer formed on the substrate, and containing at least one material selected from the group consisting of Ru, Pt, Pd, Cr, NiAl, MgO, Ti, CoCr, Ir, Ag, and Fe, and
   a perpendicular magnetic recording layer formed on the underlayer, having an easy axis of magnetization oriented perpendicularly to the substrate, and the perpendicular magnetic recording layer having magnetic crystal grains and a matrix surrounding the magnetic crystal grains,
   wherein the matrix contains at least one compound selected from the group consisting of AlAs, AlSb, $Al_2S_3$, $Al_2Se_3$, $Al_2Te_3$, CdS, CdSe, CdTe, GaAs, $Ga_2S_3$, $In_2S_3$, ZnS, ZnTe, and ZnSe; and
   wherein a ratio of a mass of the matrix in the perpendicular magnetic recording layer is 1 to 20 mol %.

2. A medium according to claim 1, wherein the magnetic crystal grains contain at least one material selected from the group consisting of Co—Pt, Fe—Pt, and Fe—Pd.

3. A medium according to claim 1, wherein the underlayer is a two or more stacked layer containing at least one combination selected from the group consisting of Ta/Ru, Ta/Ti/Ru, NiAl/Pt, NiAl/Cr/Pt, Ta/Ti/CoCr, NiTa/Ru, NiTa/Ti/Ru, NiTa/Ti/CoCr, NiNb/Ru, NiNb/Ti/Ru, NiNb/Ti/CoCr, NiAl/Pd, NiAl/Ir, NiAl/Ag, NiAl/Cr/Pd, NiAl/Cr/Ir, NiAl/Cr/Ag, NiAl/Fe/Pt, NiAl/Fe/Pd, NiAl/Fe/Ir, NiAl/Fe/Ag, MgO/Pt, MgO/Pd, MgO/Ag, MgO/Ir, MgO/Cr/Pt, MgO/Cr/Pd, MgO/Cr/Ag, MgO/Cr/Ir, MgO/Fe/Pt, MgO/Fe/Pd, MgO/Fe/Ir, and MgO/Fe/Ag, each stacked in the order named from the substrate.

4. A method of manufacturing a perpendicular magnetic recording medium comprising;
   preparing a substrate having an underlayer formed thereon, and containing at least one material selected from the group consisting of Ru, Pt, Pd, Cr, NiAl, MgO, Ti, CoCr, Ir, Ag, and Fe and
   depositing, on the underlayer, a magnetic crystal grain material and a matrix material formed from at least one compound selected from the group consisting of AlAs, AlSb, $Al_2S_3$, $Al_2Se_3$, $Al_2Te_3$, CdS, CdSe, CdTe, GaAs, $Ga_2S_3$, $In_2S_3$, ZnS, ZnTe, and ZnSe to form a perpendicular magnetic recording layer having magnetic crystal grains and a matrix of the compound surrounding the magnetic crystal grains; and wherein a ratio of a mass of the matrix in the perpendicular magnetic recording layer is 1 to 20 mol %.

5. A method according to claim 4, wherein the magnetic crystal grains contain at least one material selected from the group consisting of Co—Pt, Fe—Pt, and Fe—Pd.

6. A method according to claim 5, wherein the underlayer is a two or more stacked layer containing at least one combination selected from the group consisting of Ta/Ru, Ta/Ti/Ru, NiAl/Pt, NiAl/Cr/Pt, Ta/Ti/CoCr, NiTa/Ru, NiTa/Ti/Ru, NiTa/Ti/CoCr, NiNb/Ru, NiNb/Ti/Ru, NiNb/Ti/CoCr, NiAl/Pd, NiAl/Ir, NiAl/Ag, NiAl/Cr/Pd, NiAl/Cr/Ir, NiAl/Cr/Ag, NiAl/Fe/Pt, NiAl/Fe/Pd, NiAl/Fe/Ir, NiAl/Fe/Ag, MgO/Pt, MgO/Pd, MgO/Ag, MgO/Ir, MgO/Cr/Pt, MgO/Cr/Pd, MgO/Cr/Ag, MgO/Cr/Ir, MgO/Fe/Pt, MgO/Fe/Pd, MgO/Fe/Ir, and MgO/Fe/Ag, each stacked in the order named from the substrate.

7. A magnetic recording/reproducing apparatus comprising:
   a perpendicular magnetic recording medium which comprises a substrate, an underlayer formed on the substrate, and the perpendicular magnetic recording medium containing at least one material selected from the group consisting of Ru, Pt, Pd, Cr, NiAl, MgO, Ti, CoCr, Ir, Ag, and Fe, and a perpendicular magnetic recording layer formed on the underlayer, having an easy axis of magnetization oriented perpendicularly to the substrate, and having magnetic crystal grains and a matrix surrounding the magnetic crystal grains, the matrix material formed from at least one compound selected from the group consisting of AlAs, AlSb, $A_2S_3$, $Al_2Se_3$, $Al_2Te_3$, CdS, CdSe, CdTe, GaAs, $Ga_2S_3$, $In_2S_3$, ZnS, ZnTe, and ZnSe; wherein a ratio of a mass of the matrix in the perpendicular magnetic recording layer is 1 to 20 mol %;
   a recording/reproducing head.

8. An apparatus according to claim 7, wherein the recording/reproducing head is a single pole recording head.

9. An apparatus according to claim 7, wherein the magnetic crystal grains contain at least one material selected from the group consisting of Co—Pt, Fe—Pt, and Fe—Pd.

10. An apparatus according to claim 7, wherein the underlayer is a two or more stacked layer containing at least one combination selected from the group consisting of Ta/Ru, Ta/Ti/Ru, NiAl/Pt, NiAl/Cr/Pt, Ta/Ti/CoCr, NiTa/Ru, NiTa/Ti/Ru, NiTa/Ti/CoCr, NiNb/Ru, NiNb/Ti/Ru, NiNb/Ti/CoCr, NiAl/Pd, NiAl/Ir, NiAl/Ag, NiAl/Cr/Pd, NiAl/Cr/Ir, NiAl/Cr/Ag, NiAl/Fe/Pt, NiAl/Fe/Pd, NiAl/Fe/Ir, NiAl/Fe/Ag, MgO/Pt, MgO/Pd, MgO/Ag, MgO/Ir, MgO/Cr/Pt, MgO/Cr/Pd, MgO/Cr/Ag, MgO/Cr/Ir, MgO/Fe/Pt, MgO/Fe/Pd, MgO/Fe/Ir, and MgO/Fe/Ag, each stacked in the order named from the substrate.

* * * * *